Patented Apr. 3, 1934

1,953,840

UNITED STATES PATENT OFFICE 1,953,840

PROCESS FOR MAKING SODIUM PYROSILICATE HYDRATE

Myron C. Waddell, Lakewood, Ohio, assignor to The Grasselli Chemical Company, Cleveland, Ohio, a corporation of Delaware No Drawing. Application October 25, 1932, Serial No. 639,534

2 Claims. (Cl. 23—110)

The present invention relates to a sodium pyrosilicate hydrate of the approximate composition $Na_6Si_2O_7.10H_2O$ and to processes of making it which comprise cooling to crystallization temperatures an aqueous sodium silicate solution containing a specified amount of excess caustic soda.

Anhydrous sodium pyrosilicate of the formula $Na_6Si_2O_7$ has already been prepared from fusion mixtures (see d'Ans & Loeffler, Zeit. F. Anorg. Chem. 191, 4–12), but up to the present time no hydrates of this silicate are known; this anhydrous product has also been known in the literature as sodium-di-ortho-silicate.

I have found that sodium pyrosilicate can be produced in aqueous solution by adding the requisite amount of free caustic to an ordinary sodium silicate solution and that if further amounts of sodium hydroxide are added to hot, concentrated solutions of this pyrosilicate they will, on cooling for instance to room temperature, produce a crop of crystalline pyrosilicate hydrate containing about 10 mols of water of crystallization, i. e. the product is decahydrated sodium pyrosilicate of the formula $Na_6Si_2O_7.10H_2O$ in which the ratio of $Na_2O$ to $SiO_2$ is 3:2.

This new product is highly useful in cleaning operations where it is desired to combine strong alkalinity with the cleaning effect of sodium silicate. This new compound makes available to industry an additional member of and extends into the strongly alkaline field the series of sodium silicates which up to now were known in ratios of about 1 $Na_2O$:4$SiO_2$ down to the metasilicate of the ratio 1:1.

I have shown in my co-pending application Ser. #639,532 filed on even date herewith that concentrated solutions of sodium metasilicate containing from about 20 to 35 grams of free, or excess, NaOH produce on cooling hydrates of metasilicate.

I have also found that when adding substantially more than 35 grams of NaOH per 100 cc. to a concentrated sodium metasilicate solution, this will on cooling precipitate a new sodium silicate hydrate, namely my novel sodium pyrosilicate containing approximately 10 mols of water of crystallization. This new product is formed when the concentrated metasilicate solutions contain more than about 23 grams excess caustic per 100 cc. over that corresponding to the composition $Na_6Si_2O_7$.

So far as I am aware the upper limit for excess caustic content of the crystallizing liquor is merely dependent upon matters of convenience and 55 grams NaOH per 100 cc. is a practical limit below which the manipulations and recovery of the decahydrate are entirely within technical possibilities.

The following is a description of how I prepared in one instance a substantially decahydrated sodium pyrosilicate:

Five liters of 50° Bé. sodium hydroxide was mixed with 2 liters of 46° Bé. sodium silicate containing 29.6% $SiO_2$ and 9.1% $Na_2O$ which produced an aqueous solution of pyrosilicate containing 33 grams of free NaOH per 100 cc. in excess of that combined with silica to form pyrosilicate. The temperature was kept as high as 90° C. during the mixing in order to prevent crystallizing. After mixing it was allowed to cool slowly to about 25° C., a crystal crop of 2,538 grams crude crystals was obtained which, after freeing from mother liquor, analyzed 37.0% $Na_2O$, 24.2% $SiO_2$ and 38.8% $H_2O$ which corresponds to the formula $Na_6Si_2O_7.10H_2O$.

The following table shows the composition of crystals obtained from solutions containing different amounts of excess caustic, after freeing the crystals from their mother liquor.

| Excess caustic in original liquor | Washed crystals | | $Na_2O:SiO_2$ ratio | Mols water of crystallization |
|---|---|---|---|---|
| | %$Na_2O$ | % $SiO_2$ | | |
| 23.5 | 36.0 | 24.4 | 3:2.03 | 11.3 |
| 33.8 | 37.1 | 24.0 | 3:1.94 | 10.8 |
| 33.8 | 37.0 | 24.2 | 3:1.96 | 10.8 |
| 37.0 | 35.0 | 23.9 | 3:2.04 | 11.8 |
| 55.8 | 36.4 | 22.6 | 3:1.86 | 11.7 |

These products are well within the composition of a technical pyrosilicate, and while the amount of water appears greater than 10 mols of crystallization, it must be understood that the products were not absolutely dry and water having been determined by difference shows necessarily slightly higher than corresponds to the actual water of crystallization.

The mother liquors from such operations are saturated with pyrosilicate and contain large amounts of excess caustic. They are conveniently used to produce additional crops of pyrosilicate hydrate by strengthening them in silica and caustic content to the desired composition of a hot, concentrated pyrosilicate liquor of the requisite caustic excess.

The crude crystals as obtained above contain substantial amounts of caustic mother liquor which tenaciously adheres to them and makes it difficult to dry them. I have found that such mother liquor is easily removed from the crystals by washing with certain organic solvents and I have disclosed and claimed this washing operation in my co-pending application, Ser. #639,533 filed on even date herewith. I have also found that these crude crystals are easily purified by washing with predetermined amounts of a sodium silicate solution containing more $SiO_2$ than corresponds to the ratio 3:2. This process is disclosed and claimed in my co-pending application Ser. #639,535 filed on even date herewith.

I claim:

1. In a process of making a sodium pyrosilicate hydrate the steps of preparing a concentrated, hot, aqueous solution of sodium pyrosiliciate containing an excess of at least about 23 grams of NaOH per 100 cc. and cooling said solution to precipitate a pyrosilicate hydrate.

2. In a process of making a sodium pyrosilicate hydrate the steps of preparing a concentrated, hot, aqueous solution of sodium pyrosilicate containing from about 23 to about 55 grams excess NaOH per 100 cc. of solution, cooling said solution to room temperature and separating the crystals formed from their mother liquor.

MYRON C. WADDELL.